United States Patent [19]
Fromson et al.

[11] Patent Number: 5,711,071
[45] Date of Patent: Jan. 27, 1998

[54] CATALYTIC STRUCTURES AND METHOD OF MANUFACTURE

[75] Inventors: Howard A. Fromson, 49 Main St., Stonington, Conn. 06378; William J. Rozell, Vernon, Conn.

[73] Assignee: Howard A. Fromson, Stonington, Conn.

[21] Appl. No.: 555,216

[22] Filed: Nov. 8, 1995

[51] Int. Cl.⁶ ............................................. B23P 15/26
[52] U.S. Cl. ............................ 29/890.046; 29/890
[58] Field of Search .............. 29/890.03, 890.046, 29/428, 890.054, 527.2, 890

[56] References Cited

U.S. PATENT DOCUMENTS

| | | |
|---|---|---|
| Re. 31,104 | 12/1982 | Baldi et al. . |
| 3,693,710 | 9/1972 | Drosnin . |
| 4,173,549 | 11/1979 | Kent et al. . |
| 4,206,083 | 6/1980 | Chang . |
| 4,327,800 | 5/1982 | Miller . |
| 4,405,507 | 9/1983 | Carr et al. . |
| 4,601,089 | 7/1986 | Gal . |
| 4,665,973 | 5/1987 | Limberg et al. . |
| 4,686,202 | 8/1987 | Broecker . |
| 4,741,393 | 5/1988 | Collier . |
| 4,783,436 | 11/1988 | Brandis et al. . |
| 4,917,960 | 4/1990 | Hornberger et al. . |
| 5,026,273 | 6/1991 | Cornelison . |
| 5,201,119 | 4/1993 | Mizuno et al. . |
| 5,232,891 | 8/1993 | Hormann et al. . |
| 5,267,608 | 12/1993 | Coffinberry . |
| 5,384,100 | 1/1995 | Freund . |
| 5,485,675 | 1/1996 | Jones et al. .................... 29/890.046 |

*Primary Examiner*—Irene Cuda
*Attorney, Agent, or Firm*—Alix, Yale & Ristas, LLP

[57] ABSTRACT

Catalytic materials are used as a part of or in association with heat exchangers such as automotive radiators and air conditioning condensers. The catalytic material involves a metal substrate with a porous anodic oxide coating and metallic nodules which are electrodeposited in the pores and extend above the surface of the anodic oxide coating. The nodules are either formed of the catalytic metal or formed of other metals and then coated with the catalyst metal. The catalytic stock material is then formed into heat exchanger fins and mounted on the heat exchanger tubes. In the alternative, the catalytic stock material may be formed into a separate catalytic structure which is then mounted in an air flow stream and preferably in air-flow relationship to the heat exchanger.

19 Claims, 2 Drawing Sheets

5,711,071

CATALYTIC STRUCTURES AND METHOD OF MANUFACTURE

BACKGROUND OF THE INVENTION

The present invention relates to catalytic structures and their method of manufacture particularly as a part of or in association with heat exchangers, such as automotive radiators and air conditioning condensers. The catalytically active material may comprise the fins of the heat exchanger or be incorporated into a separate catalytic structure.

A significant air pollution problem is created by motor vehicles from the production and emission of substances such as carbon monoxide and ozone. It has been proposed that motor vehicles be equipped with catalytic reactors which would catalytically convert the pollutants contained in the air through which the vehicles are travelling. Specifically, it has been proposed that the heat exchange surface in a motor vehicle, such as the radiator and air conditioning condenser, be coated with the catalytic material which would then provide a large surface area of heated catalyst material travelling along the roadways at the situs where large quantities of these particular pollutants are produced.

The prior disclosed processes for forming a catalyst coating on a heat exchanger relate to the application of the catalyst material to a preformed heat exchange structure by applying the catalyst material, usually platinum, such as by a wash-coat that is sprayed or painted onto the formed heat exchanger. Applying such coating into the already formed small interstices of such a device presents a significant problem. Also, the catalyst materials are usually applied as salts which then require the additional step of calcining to covert the salts to the catalyst metal. On the other hand, applying the catalyst coating to the components of a heat exchanger, such as the stock material for the heat exchanger fins, prior to fabrication presents its own problem since most such coatings cannot withstand the fabrication processes such as cutting, bending, punching, etc.,.they are inherently brittle and spallable or the can delaminate.

SUMMARY OF THE INVENTION

The present invention relates to catalytic structures and the method of forming the same. In particular, the extended heat exchange surface (fins) of a heat exchanger are constructed of a fin stock which has already been prepared to include a firmly anchored catalyst material. Specifically, one embodiment of the invention involves a heat exchanger and the method of forming the heat exchanger wherein the stock material for the fins comprises a substrate with a porous anodic oxide coating and metallic nodules which include a catalytic metal anchored in the pores and extending above the surface of the coating. The nodules may be formed entirely of the catalyst metal or may initially be formed of a different, first metal which is then coated with the catalyst metal. The nodules are formed by electrodeposition of the metal. As an alternative, the deposit of the catalyst metal on the nodules may be continued so that the catalyst metal bridges over from one nodule to another to cover essentially the entire surface. The stock material for the fins with the catalyst formed thereon is then fabricated into heat exchanger fins and assembled with the heat exchanger tubes to form the heat exchanger. In the alternative, the catalytic stock material may be formed into a separate catalytic structure mounted for the flow of air therethrough and preferably in air-flow relationship to a heat exchanger.

DESCRIPTION OF THE PREFERRED EMBODIMENT

According to the first step of the present invention, a porous anodic oxide coating is formed on the surface of a substrate metal plate or web preferably made of aluminum. The substrate could also be other anodizable metals such as titanium or aluminum bonded to another material such as steel. The substrate metal may be generally smooth or it may be roughened to form a grained or pitted surface. Conventional graining techniques such as brush graining with an abrasive can be employed or more severe toughening such as scratching, etching or roll forming a uniform pattern can be used to obtain greater asperity. The formation of porous anodic oxide coatings in the anodizing process is well known in the art and is accomplished by using the known electrolytes which result naturally in porosity such as sulfuric acid, phosphoric acid and chromic acid to name a few. Nodules ranging in size from several microns to sub-micron size are then formed, by electrodepositing a platable metal into the pores. The metal nodules are discrete, individual islands of metal anchored in the pores and projecting above the anodic oxide coating. The metal nodules may be formed entirely of a catalyst metal or they may be formed of a first base metal and then coated with catalyst metal.

The pore size of an unsealed anodic oxide coating on an aluminum substrate can be made to vary in diameter and depth by varying the anodizing conditions as is known in the art. For purposes of the present invention, it is preferred to form an anodic oxide layer having pores with a diameter in the range of about 50 to 300 Angstroms. Since there are 10,000 Angstroms in a micron, sub-micron metal nodules can easily be formed according to the present invention. A desired nodule size range and density can be attained by control of the anodizing and electrodeposition processes.

Figure 1:
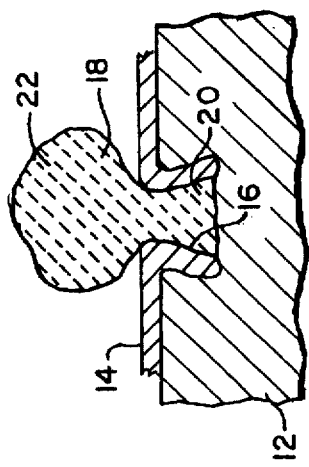
FIG 1 is an enlarged cross-sectional view depicting a metal nodule formed in a pore of an anodic oxide layer on a metal substrate and extending above the surface thereof with a catalyst metal coating thereon.

FIG. 1 shows a cross-section of a portion of a heat exchanger fin which has been prepared according to one embodiment of the present invention. An anodizable metal substrate 12 such as aluminum or titanium has an unsealed, porous anodic oxide layer 14 formed therein with a pore being shown at 16. Electrolytically deposited base metal, such as copper or chromium, is deposited in the pore 16 to form the nodule designated 18 having a root portion 20 in the pore 16 and a head portion 22 extending above the pore 16 and above the anodic oxide layer 14. Deposited onto the head portion 22 is a coating of the catalyst metal 24 such as platinum. Other examples of catalyst metals which could be used include palladium, ruthenium, rhodium and other noble metals as well as rare earth metals.

Figure 2:
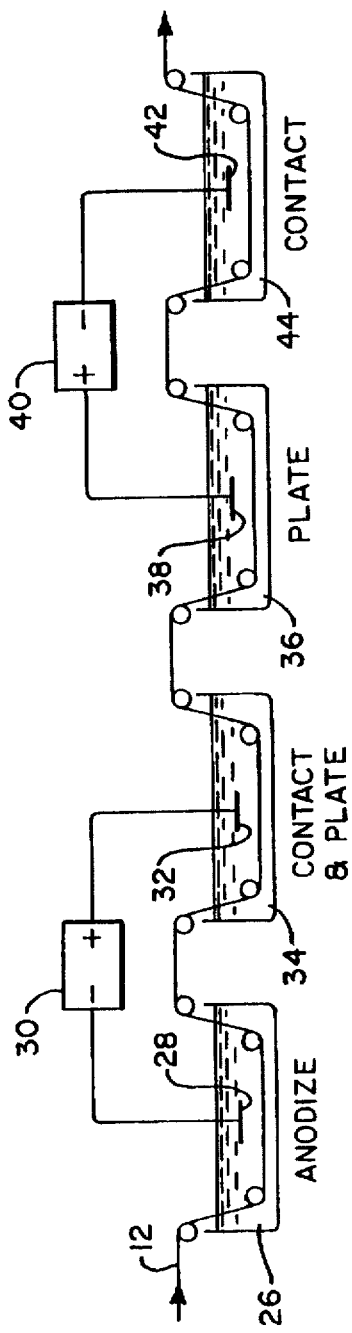
FIG. 2 is a diagrammatic representation of one possible process for continuously anodizing an aluminum or other metal web and plating metal nodules thereon according to the present invention.

The process of the present invention can be carried out batchwise on plate material or alternatively carried out continuously using a metal web of a suitable thickness which is continuously anodized, plated with the first metal if desired, and plated with the catalyst metal. The formation of the anodic oxide coating and the deposition of the metal into the pores of the anodic oxide coating can be accomplished using the known techniques as described in the previously mentioned U.S. Pat. Nos. 3,929,594 and 4,021,592. As taught by that prior art, various combinations and arrangements of anodizing cells, contact cells and plating cells can be employed. FIG. 2 illustrates one of these possible arrangements merely as an example. In the following description, an aluminum web, copper base metal nodules and platinum catalyst metal coating will be used as an example, but it is to be recognized that other materials such as those previously mentioned can be employed.

The aluminum web substrate 12 is first fed into the anodizing cell 26 having a cathode 28 connected to a source of direct current 30 and containing a standard anodizing electrolyte bath. The anodizing direct current from the source 30 is passed into the aluminum web through the anode 32 in the contact and plating cell 34. Alternately, the anodizing current can be passed into the web by means of a contact roller such as illustrated in the prior U.S. Pat. Nos. 3,929,594 and 4,014,756.

Once the anodic oxide layer has been formed on the web in the cell 26, the anodized web is passed to the contact and plating cell 34. In this cell 34 the anode 32 is the platable metal selected for the base of the nodule to be formed, such as copper or chromium. The cell contains an appropriate electrolyte and the anode 32 is connected to the source 30 of direct current power as stated above.

In the plating cell 34, the platable metal from the anode is deposited in the pores of the anodic oxide layer which first forms the root 20 of the nodule as illustrated in FIG. 1. The plating operation is continued for the length of time required to deposit the amount of base metal necessary to form the nodule 18 including the head portion 22 of the desired size. At this point, the web is removed from the plating cell 34 and introduced into the next plating cell 36.

Plating cell 36 contains an appropriate electrolyte and the anode 38 which is a platable catalytic metal such as platinum or one of the other catalyst metals previously mentioned. The anode 38 is connected to the direct current power source 40 which is also connected to the cathode 42 in the contact cell 44. The metal from the anode 38 is now deposited on the surface of the nodules that had been formed in plating cell 34 to form the catalyst metal coating 24 illustrated in FIG. 1. After the desired thickness of catalyst metal has been deposited, the web is removed from the cell 44 after which it may be washed or otherwise treated as appropriate. The resultant product is a web of aluminum with an anodic oxide coating and the attached nodules of the first metal coated with a thin layer of catalytic metal extending above the anodic oxide coating. This web is then cut and shaped as required for forming the catalytic fins for the heat exchanger of the present invention.

The present invention permits the control of the population density of the catalyst nodules on the anodized substrate. Although the anodic oxide coating on a roughened metal substrate is of uniform thickness, the electrodeposition of a metal into the pores of the oxide will be initiated preferentially at the high points of the surface. At lower voltages, the plating process is more selective and the tendency is that only the pores at the high points will preferentially participate in the plating process with less plating in the pores in the valleys. As this voltage is increased, the plating process becomes less selective and the number of pores acting as seeding sites increases. Therefore, the population of seeding sites and nodules formed can be controlled by the voltage. Also, since the plating begins first on the peaks, the degree of asperity or vertical height difference between the valleys where there is little catalyst and the peaks where there is more catalyst can be controlled. The more asperity desired, the more the substrate is roughened and the lower the voltage used.

Figure 3:
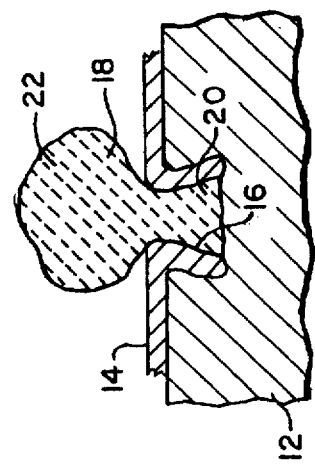

As previously indicated, the nodules may be formed with a first metal, such as copper, and then coated with the catalyst metal as has been described thus far, or the nodules can be formed entirely of the catalyst metal. FIG. 3 is an enlarged cross-sectional view, similar to FIG. 1, which illustrates such a nodule. Shown in this FIG. 3 is the metal substrate 12, the porous anodic oxide layer 14, pore 16 and the nodule 18 with the root portion 20 and the head portion 22. In this case, the entire nodule 18 is formed of the catalyst metal, such as platinum, and there is no nodule coating 24 as in FIG. 1. With respect to the process as shown in FIG. 2, there would be only one plating cell instead of two.

Figure 4:
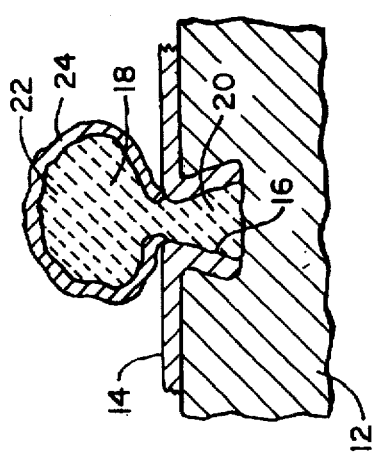
FIGS. 3 and 4 are enlarged cross-sectional views depicting variations in the deposition of the catalyst metal.

FIG. 4 illustrates a further variation of the present invention wherein the entire surface of the web or plate is coated with catalyst. In this variation, the nodules can be initially formed from a first metal, such as copper, or the entire electrodeposition can be with the catalyst metal as shown in this FIG. 4. In either case, the deposition of the metal begins in the pores and tends to create the discrete nodules. However, the electrodeposition is continued such that the metal builds-up and eventually bridges over from one nodule to another generally as illustrated.

Figure 5:
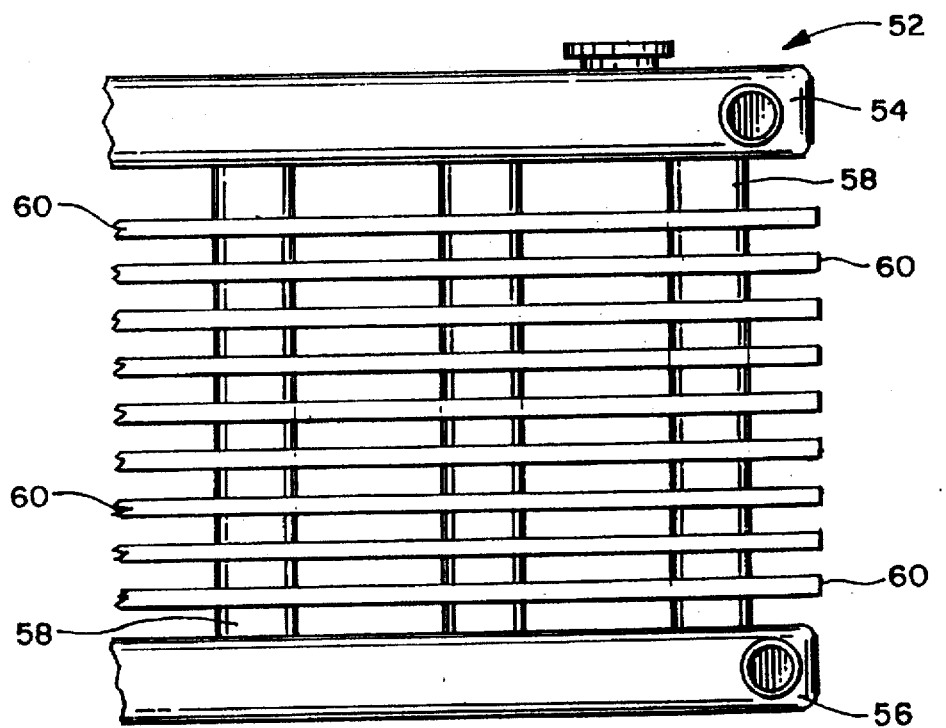
FIG. 5 illustrates a heat exchanger formed with the catalyst-containing fin stock of the present invention.

FIG. 5 illustrates an example of a portion of a heat exchanger which has been constructed according to the present invention in which the heat exchanger fins contain the catalyst material as has been described. Illustrated is an automotive radiator 52 comprising upper and lower chambers or headers 54 and 56, fluid flow tubes 58 connected between the headers 54 and 56 and the parallel spaced fins 60. The tubes 58 extend through apertures formed in the fins 60 with the fins being connected to the tubes by conventional methods to provide good heat transfer as well as a rigid mechanical structure. This FIG. 5 is merely one example of a heat exchanger constructed according to the present invention and it is to be recognized that the invention can be applied to any finned tube heat exchange structure. Also by way of example, reference is made to prior U.S. Pat. Nos. 3,693,710; 4,327,800 and 4,601,089 illustrating various ways in which heat exchanger tubes and fins can be assembled into a heat exchanger. Any of these or other assembly techniques could be used in the present invention to assemble the catalytic fin material to heat exchanger tubes.

The present invention lends itself to the formation of heat exchangers with a mixture of different catalytic materials. A variety of fin stocks can be prepared each containing a different catalyst. For example, a platinum catalyst fin stock and a rhodium catalyst fin stock could be formed into fins and then alternately assembled into the heat exchange tubes or assembled in any desired order and proportion.

In an alternate embodiment of the present invention, the metal surface containing the catalyst material is not formed as the integral heat exchanger fins assembled onto the heat exchanger fluid flow tubes. This embodiment would be particularly useful for situations where it would not be practical or possible to attach the catalytic fins to the heat exchanger tubes to form a good heat transfer contact due to the high temperature required for certain such operations. Instead, a separate structure is formed which is constructed of catalytic material formed according to the present invention. The structure may take any desired configuration such as a grid structure formed of flat fin-like elements or a screen or wire mesh structure. For example, an aluminum wire may be treated in accordance with the present invention to form the catalytic nodules thereon and then the wire can be woven into a catalytic screen. In the alternative, the wire could be woven into an aluminum screen first and then the catalyst formed on a web of the screen material just as previously described for the solid aluminum web. A further alternative would be to use fine catalytic wire which is formed in a random arrangement into a mesh much like steel wool. In any case, the catalytic structure is constructed and located such that the air to be treated flows through the structure. The structure is preferably located directly adjacent to and downstream from the heat exchanger with respect to the direction of air flow so that the air flowing over and through the catalytic structure is air that first comes through and is heated by the heat exchanger. Also, the separate catalytic structure could be employed even when the heat exchanger does contain catalyst in order to increase the catalyst surface area.

Figure 6:
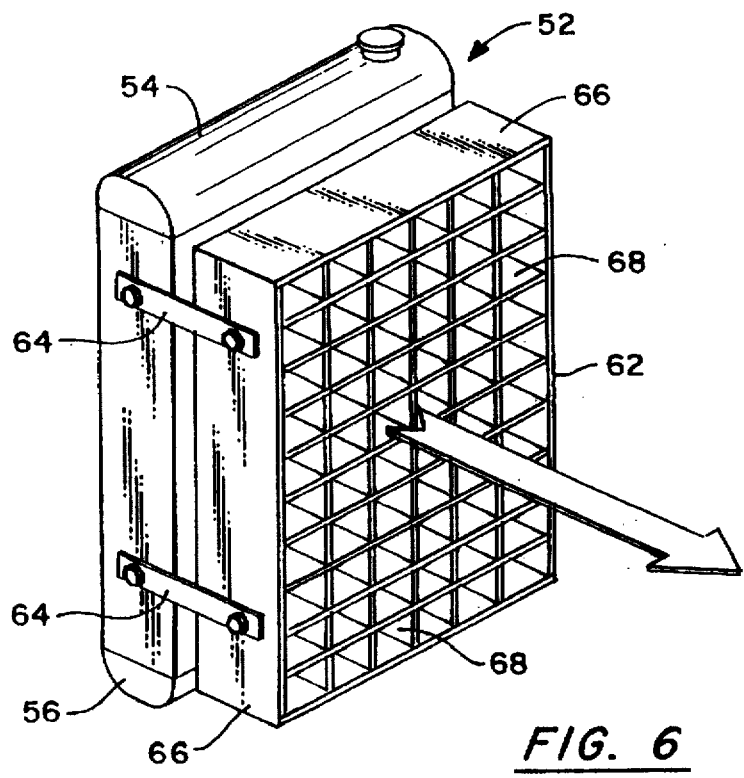
FIG. 6 illustrates an alternate embodiment of the present invention wherein the catalyst fin material is formed as a separate structure adjacent to the heat exchanger.

FIG. 6 shows such an arrangement wherein a separate catalytic structure 62 is formed as a grid and mounted adjacent to the automotive radiator 52 by the mounting straps 64. In this case, the automotive radiator 52 need not contain catalytic fins although it may. The grid 62 comprises an outside frame 66 in which are mounted the catalytic fins 68 in an "egg-crate" configuration although the fins could be arranged within the frame 66 in any desired configuration. As with the heat exchanger, fin stock with different catalytic materials can be mixed in any desired combination. The arrow 70 indicates the direction of air flow showing that the air passes through the radiator 52 first and is heated prior to passing through the catalytic grid 62. This heating of the air enhances the desired catalytic reactions. Also, the juxtaposition of the grid and radiator means that the automotive fan which draws air through the radiator will also draw that same air through the grid. The spacing of the fins in the grid as illustrated in this FIG. 6, as well as the spacing in the radiator in FIG. 5, is merely for illustrative purposes. The actual spacing would be much closer as in a conventional radiator or air conditioning condenser. One of the advantages of this separate catalytic structure is that it can be easily manipulated. For example, it can easily be detached from the heat exchanger for cleaning or replacement. In addition, the separate catalytic structure can be located in an air stream other than at the outlet of the heat exchanger (radiator or air conditioning condenser). This might be desired if it were not required that a heated environment be provided.

The catalytic stock produced according to the present invention lends itself to the fabrication techniques required to form fins, wires or other structural forms. It is resistant to mechanical shock and does not result in a brittle coating which could be damaged during fabrication. This invention is also suited to the use of titanium or aluminum bonded to steel where structural strength is a prerequisite. It may be further desirable to treat the aluminum bonded to steel such that the aluminum oxide is converted to the more catalytically active gamma form. This treatment can be accomplished, for example, by calcination at temperatures above 300° C. In this way, a multifunctional catalyst is obtained containing both the metal catalyst nodules (or their oxide) and the gamma alumina.

We claim:

1. A process of forming a heat exchanger comprising heat exchange tubes and metal fins attached to said heat exchange tubes wherein said metal fins incorporate a catalyst metal comprising the steps of:
   a. forming a porous anodic oxide layer on a substrate metal surface;
   b. electrolytically depositing a first metal into the pores of said porous anodic oxide layer and continuing said electrolytic deposition to form nodules formed of said first metal anchored in said pores and extending above the surface of said anodic oxide layer;
   c. depositing a second catalytic metal onto said nodules of said first metal to form catalytic nodules anchored to said substrate;
   d. forming heat exchanger fins from said substrate having said catalytic nodules thereon;
   e. attaching said fins to said heat exchange tubes to form said heat exchanger.

2. A process as recited in claim 1 wherein said substrate is selected from the group consisting of aluminum and titanium and said anodic oxide layer is the corresponding metal oxide.

3. A process as recited in claim 2 wherein said first and second metal are the same catalyst metal.

4. A process as recited in claim 3 wherein said catalyst metal is selected from the group consisting of palladium, platinum, ruthenium, iridium, rhodium and rare, earth metals.

5. A process as recited in claim 1 wherein said first and second metal are the same catalyst metal.

6. A process as recited in claim 5 wherein said catalyst metal is selected from the group consisting of palladium, platinum, ruthenium, iridium, rhodium and rare earth metals.

7. A process as recited in claim 1 wherein said substrate metal is aluminum bonded to steel.

8. A process as recited in claim 1 wherein said anodic oxide is aluminum oxide and further including the step of treating said aluminum oxide so as to convert it to gamma aluminum oxide.

9. A process as recited in claim 5 wherein said anodic oxide is aluminum oxide and further including the step of treating said aluminum oxide so as to convert it to gamma aluminum oxide.

10. A process as recited in claim 1 wherein said step of depositing said second metal comprises the step of electrodeposition.

11. A process as recited in claim 1 wherein said step of depositing said second metal comprises the step of electroless chemical deposition.

12. A method of forming a heat exchanger core comprising heat exchange tubes and metal fins incorporating catalyst metals attached to said heat exchange tubes comprising the steps of:
   a. providing first and second metal substrate fin stock;
   b. forming a porous anodic oxide layer on said first and second metal substrates;
   c. forming metal nodules on said first and second metal substrates, said metal nodules being anchored in said pores and extending above the surface of said porous anodic oxide layers;
   d. depositing a first catalytic metal onto said nodules on said first metal substrate and a second catalytic metal onto said nodules on said second metal substrate;
   e. forming first heat exchanger fins from said first metal substrate having said nodules with said first catalytic metal deposited thereon and second heat exchanger fins from said second metal substrate having said nodules with said second catalytic metal deposited thereon;

f. attaching said first and second heat exchanger fins to said heat exchange tubes; and g. forming a heat exchanger core from said heat exchanger tubes with said first and second heat exchanger fins attached thereto.

13. A method as recited in claim 12 wherein said first and second heat exchanger fins are alternately attached to said heat exchange tubes.

14. A method as recited in claim 13 wherein said first and second catalytic metals are each selected from the group consisting of palladium, platinum, ruthenium, iridium, rhodium and rare earth metals.

15. A method as recited in claim 14 wherein said metal nodules on said first metal substrate and said metal nodules on said second metal substrate are formed of the same metal.

16. A method as recited in claim 14 wherein metal nodules on said first metal substrate and said metal nodules on said second metal substrate are formed of different metals.

17. A method as recited in claim 16 wherein said different metals for said first and second nodules are each selected from the group consisting of copper and chromium.

18. A method as recited in claim 12 and further including the step of treating said porous anodic oxide layer so as to convert it to gamma aluminum oxide.

19. A method as recited in claim 18 wherein said step of treating said porous anodic oxide layer comprises the step of calcining at a temperature above 300° C.

* * * * *